United States Patent

Powell, Sr.

[11] Patent Number: 4,488,494
[45] Date of Patent: Dec. 18, 1984

[54] RAILWAY WHEEL CONVERSION APPARATUS FOR ROAD VEHICLES

[76] Inventor: Parks L. Powell, Sr., 660 Bankhead Hwy., Mableton, Ga. 30059

[21] Appl. No.: 465,809

[22] Filed: Feb. 11, 1983

[51] Int. Cl.³ .................... B61D 15/00; B61F 13/00
[52] U.S. Cl. .......................... 105/215 C; 105/215 R
[58] Field of Search ............... 105/177, 215 R, 215 C

[56] References Cited

U.S. PATENT DOCUMENTS

| | | | |
|---|---|---|---|
| 2,140,885 | 12/1938 | Soulis | 105/215 C |
| 3,730,105 | 5/1973 | Holley | 105/215 C |
| 3,804,025 | 4/1974 | Elliott | 105/215 C |
| 3,980,025 | 9/1976 | Olson, Sr. et al. | 105/215 C |
| 4,077,328 | 3/1978 | Taylor | 105/215 C X |
| 4,133,269 | 1/1979 | Taylor | 105/215 C |

Primary Examiner—Robert B. Reeves
Assistant Examiner—David F. Hubbuch
Attorney, Agent, or Firm—Rodgers & Rodgers

[57] ABSTRACT

Apparatus for the conversion of a vehicle from conventional road use to use on railroad tracks is provided and comprises a support arm attached to the vehicle frame at one end and to the vehicle suspension adjacent the axle at the other end, a base plate pivotally mounted on the support arm, a railway wheel axle with associated wheels secured to the base plate, a hydraulic cylinder operable to swing the railway wheel from a retracted position to an extended position and back, a securing notch formed in the base plate, a securing pin extending from the hydraulic cylinder through the base plate and being adapted to cooperate with the securing notch to maintain the railway wheel in the extended position, and a guide bar in the extended position engaging the inside sidewall of the vehicle highway tire to maintain straight ahead tire orientation.

7 Claims, 4 Drawing Figures

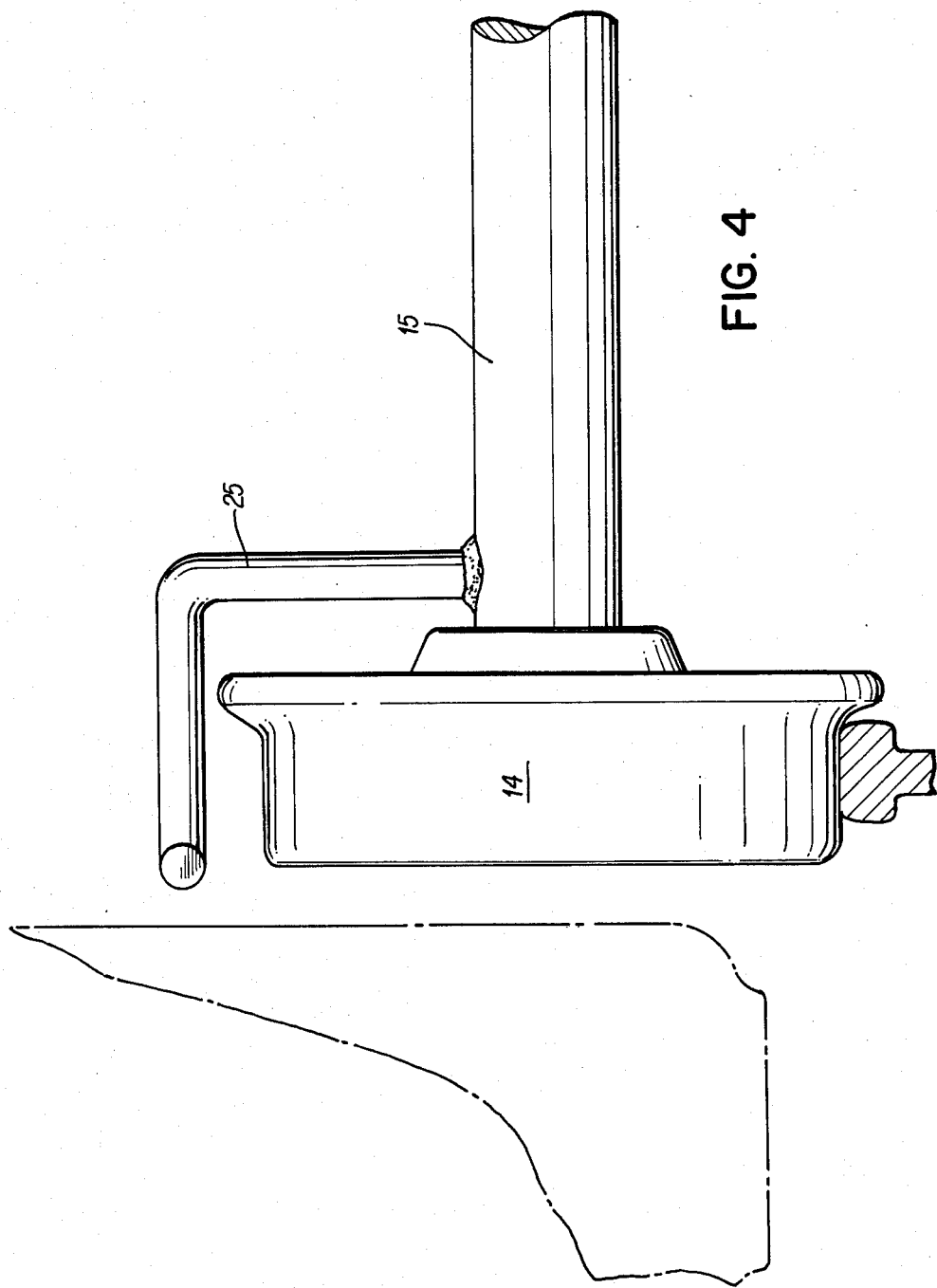

RAILWAY WHEEL CONVERSION APPARATUS FOR ROAD VEHICLES

TECHNICAL FIELD

This invention relates to means to allow conventional vehicles, such as automobiles and trucks, to be operated on normal roadways and then conveniently transferred to a railroad track whereby dependable operation thereon is achieved.

BACKGROUND ART

Various means are known by which conventional road vehicles are converted from normal highway use to use on railroad tracks. Various examples of known mechanisms and methods are disclosed in U.S. Pat. Nos. 2,482,564; 2,986,102; 3,134,343; 3,581,671 and 4,133,269. Historically the various means for converting vehicles to railway use have been undesirable due to unnecessary complexity and undesirable instability.

DISCLOSURE OF THE INVENTION

Railway wheel conversion apparatus for a road vehicle, the vehicle comprising a frame, suspension means and a frame extension mounted forward of the frame, the apparatus comprising a support arm attached at one end to the frame extension and at the other end to the suspension means, a base plate pivotally mounted on the support arm, a railway wheel associated with the base plate and adapted to rotate, hydraulic cylinder means operably connected to the base plate to impart swinging movement thereto, a securing notch formed along the edge of the support arm, and a securing pin extending from the cylinder to maintain the railway wheel in the extended position.

BRIEF DESCRIPTION OF THE DRAWINGS

In the drawings,

FIG. 4 is an enlarged front view of the railway wheel in the extended position.

BEST MODE FOR CARRYING OUT THE INVENTION

Figure 1:
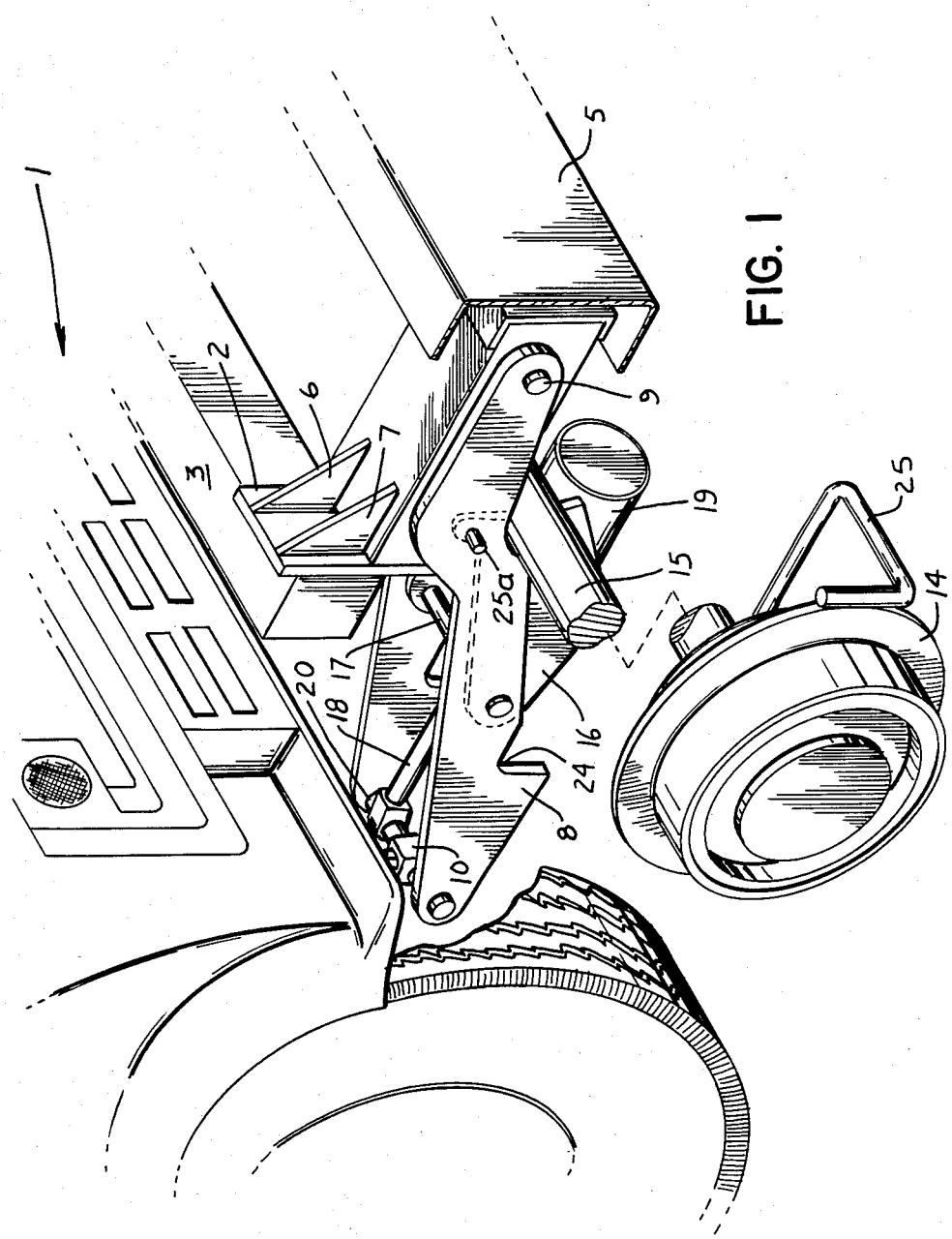
FIG. 1 is a perspective view of a portion of the railway wheel conversion apparatus formed according to this invention.

With reference to the drawings and with particular reference to FIG. 1, the numeral 1 generally designates a conventional road vehicle such as a heavy duty truck. The numeral 2 designates an attachment plate which is formed on the front portion of truck frame 3 and bumper extension 4 is secured to attachment plate 2 by means of welding or the like. Relocated front bumper 5 is similarly attached to the front of bumper extension 4. Support plates 6 and 7 are secured to bumper extension 4 for the purpose of providing the necessary structural reinforcement.

According to this invention, support arm 8 is connected to bumper extension 4 by means of bolt 9. The end of support arm 8 extending toward the rear of vehicle 1 is attached to the vehicle suspension means by means of attachment assembly 10. More specifically attachment assembly 10 is secured to vehicle front leaf spring 11 by means of nut and bolt means 12. Front leaf spring 11 is mounted on front torsion bar 13 as is well known.

For the purpose of converting vehicle 1 from highway use to use on a railroad track, flanged railway wheel 14 is provided and is rotatably mounted on railway wheel axle 15. In order to impart swinging movement to railway wheel 14, railway wheel axle 15 is suitably secured to base plate 16 by means such as welding and the like. Base plate 16 is pivotally mounted on pin 17 which extends through an aperture in support arm 8.

Figure 3:
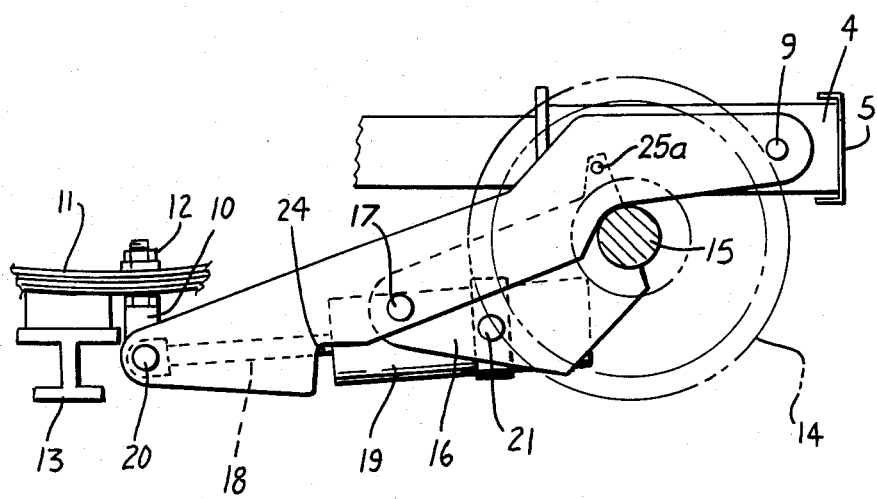
FIG. 3 is a side elevational view showing the railway wheel in the retracted position.

In order to impart swinging movement to railway wheel 14 and related elements, a hydraulic cylinder assembly is provided in the form of cylinder ram 18 and cylinder 19. At one end thereof, ram 18 is pivotally mounted on rod 20 of attachment assembly 10. Also cylinder 19 is secured to base plate 16 by means of securing pin 21 which is integral with and extends from cylinder 19 through an appropriate aperture formed in base plate 16. For purposes of operational safety, apertures 22 and 23 are formed respectively in support arm 8 and base plate 16. When apertures 22 and 23 are aligned as shown in FIG. 3, safety pin 25a is inserted through the apertures which prevents base plate 16 and support arm 8 from moving apart. Also securing notch 24 is formed on the lower edge of support arm 8. Finally, guide bar 25 is attached to axle 15 by welding and is positioned so as to engage the inside sidewall of the vehicle tire when the conversion apparatus is moved into the extended position.

Figure 2:
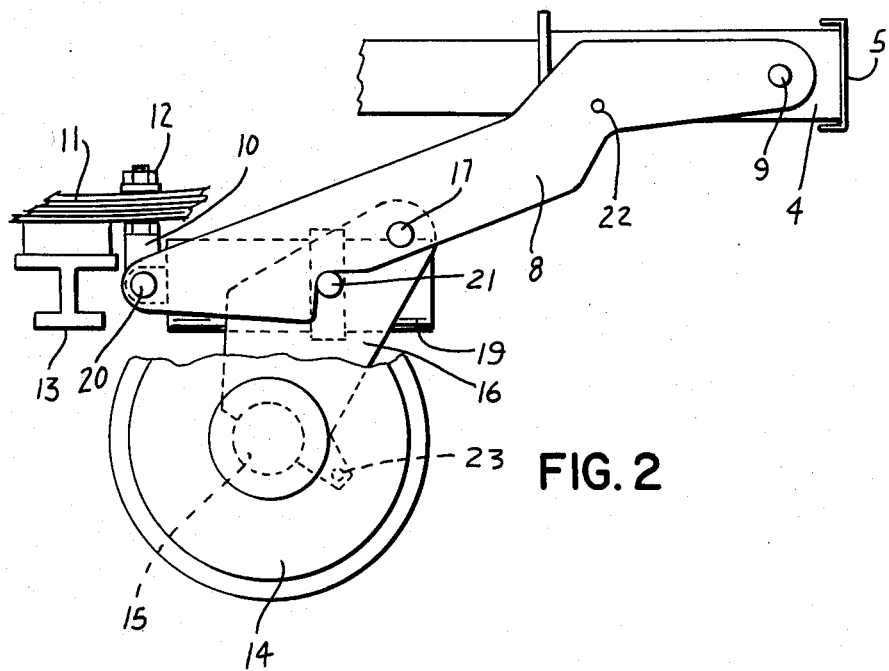
FIG. 2 is a side elevational view showing the railway wheel in the extended position.

Therefore, according to this invention, with the railway wheel conversion assembly mounted on truck 1 in the position as shown in FIGS. 1 and 3, vehicle 1 can be operated in a normal manner on any conventional highway. Then as desired vehicle 1 can be converted to operation on a railroad track by physically driving the vehicle onto the track so that the railway wheels 14 are parallel and above the respective rails. Then the hydraulic cylinder assembly 18, 19 is activated in conventional fashion which in turn causes base plate 16 and the railway wheel elements attached thereto to swing in a clockwise direction as shown in FIG. 3 to the position as shown in FIG. 2. In this manner railway wheel 14 is swung past the center line of pivot point 17 into a position whereby securing pin 21 is positioned in abutting contact with securing notch 24. Simultaneously with this operation, railway wheel 14 comes into contact with the railroad track and the vehicle is lifted upwardly. Since the apparatus is held securely in place by the interaction of securing pin 21 and securing notch 24, operational failure is virtually eliminated and structural integrity is not solely dependent on the hydraulic means of the apparatus or the vehicle frame structure.

When it is desired to change the vehicle back to highway use, the procedure is simply reversed and railway wheel 14 is maneuvered to the retracted position.

Also since the apparatus according to this invention is directly connected to the vehicle suspension means, any irregularities in the tracks themselves are absorbed by the vehicle springs. Without this capability it would be necessary for at least one of the railway wheel axles to pivot transversely to the railroad track. Attachment directly to the suspension means also provides a cushioned ride which is less damaging to the vehicle contents and operator and the highway tires are maintained in a safe vertical position relative to the railway track. Conventional devices which are not directly connected to the suspension means require that the vehicle be lifted upwardly an inordinate amount in order for the highway tires to clear the track. This in turn can cause permanent damage to the vehicle suspension system. Of course, railway wheel and related apparatus is mounted on the other side of the vehicle than the side shown in the drawings for use in connection with the other rail.

INDUSTRIAL APPLICABILITY

By this invention apparatus is provided which gives a conventional highway vehicle the capability to be operated additionally on a railroad track and which is dependable, efficient and structurally reliable.

I claim:

1. Railway wheel conversion apparatus for a road vehicle, said vehicle comprising a frame, suspension means, and a frame extension mounted on the front of said frame, said apparatus comprising a support arm attached at one end to said frame extension and extending generally rearwardly thereof and at the other end to said suspension means, a base plate pivotally connected to said support arm, a railway wheel axle secured to said base plate generally remote from the connection between said base plate and said support arm, a railway wheel rotatably mounted on said railway wheel axle, hydraulic cylinder means operably connected to said base plate so as to impart swinging movement thereto, a securing notch formed along the edge of said support arm, and a securing pin extending from said cylinder means and adapted to cooperate with said securing notch when said railway wheel is disposed in the extended position.

2. Apparatus according to claim 1 wherein said railway wheel is adapted to rotate past the centerline of the connection between said base plate and said support arm.

3. Apparatus according to claim 1 wherein said vehicle suspension means comprises a leaf spring and the rearward end of said support arm is attached to said leaf spring.

4. Apparatus according to claim 1 wherein a pair of apertures are formed respectively in said support arm and said base plate.

5. Apparatus according to claim 4 wherein a safety pin is adapted to cooperate with said pair of apertures when said railway wheel is in the retracted position.

6. Apparatus according to claim 1 wherein said securing notch is formed on the lower edge of said support arm.

7. Apparatus according to claim 1 wherein a tire is mounted on said suspension means and wherein a guide bar is attached to said railway wheel axle and is positioned adjacent the inside of said tire when said apparatus is in the extended position.

* * * * *